Oct. 8, 1929.   W. M. CASSETTY, JR., ET AL   1,731,125
LIGHT PROJECTOR
Filed Sept. 10, 1928
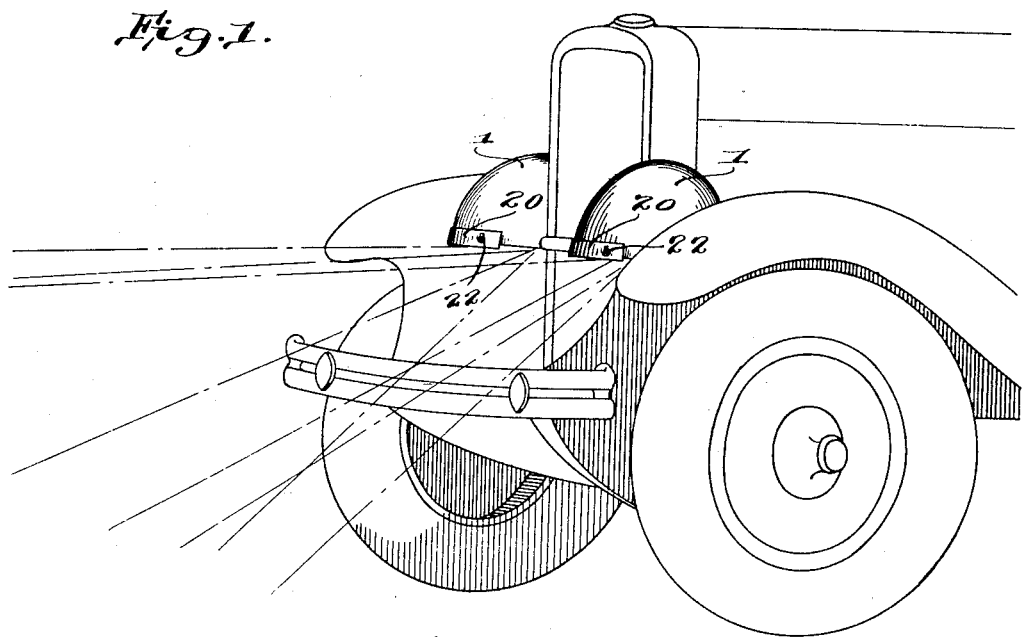
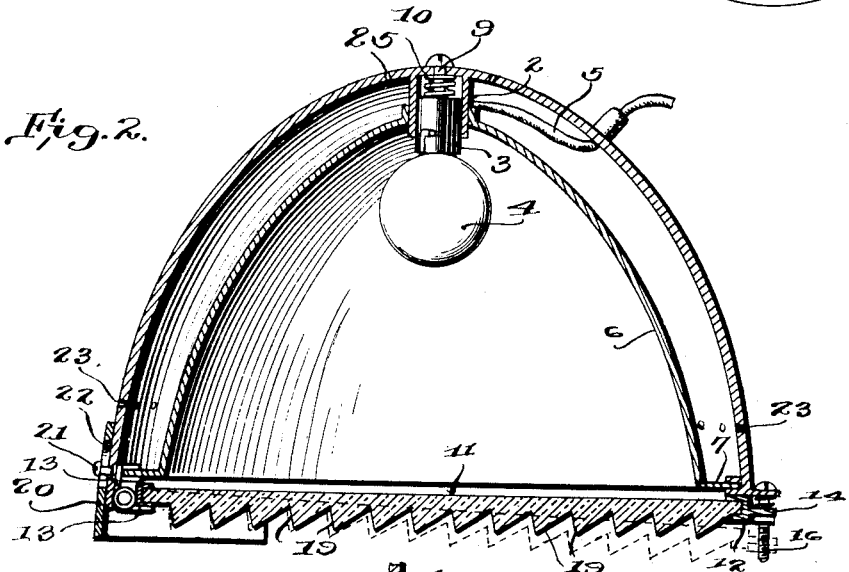
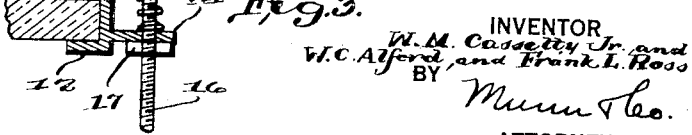
WITNESSES
C. D. Shillinger
INVENTOR
W. M. Cassetty Jr. and
W. C. Alford, and Frank L. Ross
BY
Munn & Co.
ATTORNEY Patented Oct. 8, 1929

1,731,125

UNITED STATES PATENT OFFICE

WILLIAM MARTIN CASSETTY, JR., WILLIAM CUTTER ALFORD, AND FRANK L. ROSS, OF NASHVILLE, TENNESSEE

LIGHT PROJECTOR

Application filed September 10, 1928. Serial No. 305,045.

Our invention relates to light projectors, and is particularly adapted for use and will be shown and described in connection with vehicle head lights, since it is particularly effective in adequately illuminating the roadway in advance of the vehicle and with absolutely no glare in the eyes of a person facing the vehicle as it approaches.

It is common knowledge that vehicle head lights now in common use and employing so called non-glare lenses in practical use are not free from glare under actual operating road conditions since they are focused standing on a level roadway to project a beam of light in a horizontal plane, which beam at a distance from the head light specified by head light regulations is at a predetermined height from the roadway. The inclines, grades, and irregularities of road surfaces cause elevation of the front end of the vehicle and consequently increase the height of the projected beams from the ground ahead producing blinding glare in the face of pedestrians and occupants and drivers in approaching vehicles.

It is the object of our invention to provide a head light which will operate under practical road conditions to provide adequate road illumination absolutely without glare and this result we have accomplished through the medium of indirect lighting.

A feature of our invention consists in the provision of a head light mounted to conceal a source of light from the front of the vehicle and to reflect the light rays downwardly toward the ground, in combination with a refracting lens through which the light is projected and which is effective to bend and project the rays of light forwardly as a brilliant roadway illumination adequate for all practical driving conditions. The source of light and the reflector which projects rays downwardly are not visible to persons facing the vehicle, and glare therefore cannot be transmitted. Since the light source and reflector are concealed, more powerful lights of higher candle power can be used to provide full road illumination with safety to all. Where, as at present, direct lighting is employed in head lights, the higher powered electric bulbs cannot be used due to the intense glare produced.

More specifically, this feature of the invention is provided by a light casing and reflector housed therein of substantially standard form supported in an inverted position to project its light rays substantially vertically downward to the ground and through a refracting lens specifically designed to deflect the rays forwardly. Provision is made for focusing adjustment of the light bulb and for tilting adjustment of the refracting lens adjustably to vary the angle of forward projection and spread of the light.

Additional facilities are provided for ventilation and cooling and a ray height determining means adapting the head light to different vehicles, height of support and other uses is also provided.

The invention consists in the constructions, arrangements and combinations of parts as hereinafter described and claimed and will be more clearly apparent from the following detailed specification which is to be read in conjunction with the accompanying drawings forming part thereof and in which:

Figure 1 is a perspective view of the front end of a motor vehicle equipped with head lights embodying the light projecting features of the present invention.

Figure 2 is a transverse vertical sectional view on an enlarged scale of one of these head lights.

Figure 3 is a fragmentary sectional view showing the means for effecting adjustment of the refracting lens to vary the height and angle of the forwardly refracted light rays.

As previously indicated, we employ for light projection without glare indirect lighting conveniently, in its application to motor vehicles, the concealed source of light may take the form of outer light concealing casings 1 of inverted or dome-like form resembling in outline the conventional automobile headlight casing but supported in inverted, substantially vertical position as indicated in Figure 1.

In the top vertical center of the casing an inturned vertical tube 2 receives and guides the sleeve 3 carrying the usual connecting plug and in the inner end of which the base of the electric light bulb 4 is inserted to make contact therewith. Wires 5 lead from the sleeve plug in the usual manner to the exterior of the casing 1 for connection to the battery. A reflector 6 having a contour similar to that of the casing 1 and a central flanged opening at its top center rotatably seats over the sleeve 2 at its top and has its base provided with the usual spaced edge flanges 7 seating between spaced bifurcated lugs 8 on the inner face of the casing at its lower edge. Focusing of the light bulb 4 relatively to its reflector is, as shown, provided for by the usual focusing screw 9 (Figure 2) threading through the casing and fixed at its inner end to the plug sleeve 3 carrying the bulb 4, a coiled spring 10 being, as usual, coiled about the shank of the adjusting screw between the plug sleeve and casing.

The casing 1, or in the application of the light projector to an automobile, the pair of headlight casings 1, are supported in inverted position so that the rays of light from the bulb 4 and reflector 6 are projected downwardly toward the ground, the longitudinal axis of the casing being substantially perpendicular to the ground. With this arrangement, therefore, the light bulb and reflector are entirely concealed from the view of pedestrians or the occupants of vehicles in front of the casings. Rays of light thus directed downwardly toward the ground are bent and projected forwardly to illuminate the roadway, or other space to be lighted by means of a projector in the form of a refracting lens 11 mounted over and closing the open lower end of the inverted casing. An annular lens mount 12, angular in cross section, provides a seat for the outer edge of the lens 11 and at its front center is connected to the lower front edge of the casing 1 by a hinged lug 13. At its rear center, the lens mount is provided with a projecting lug 14 which alines with a similar lug 15 projecting outwardly from the lower edge of the casing 1 at its rear center point. As shown in Figure 3, these lugs are provided with alined bores through which extend the shank of an adjusting bolt 16. An adjusting nut 17 threads on the lower end of the shank and engages the underside of the lug 14. Adjustment is maintained by a coil spring 18 encircling the shank and interposed between the lugs 14 and 15. Obviously, by means of the adjusting nut 17, the rear end of the lens mount may be moved upwardly and downwardly to tilt the plane of the lens relatively to the horizontal.

This adjustment of the lens mount and lens is for the purpose of varying the angle of forward projection of the light rays through the lens. As shown in Figure 2, the lens 11 is of the refracting type and is formed upon its outer face with a plurality of transversely extending angled surfaces 19 by means of which the rays of light directed downwardly from the light bulb 4 and reflector 6 are bent and projected forwardly in the usual manner with lenses of this type. Preferably, the angularity of the inclined refracting surfaces 19 is such that refraction of the rays is at an obtuse angle so that the projected rays of light extend forwardly and incline downwardly toward the roadway, ground or floor as suggested by the broken lines in Figures 1 and 2. This inclination is secured with the lens mount adjusted at its rear end to uppermost position. The angle of projection toward the ground may be decreased to incline the rays more to the horizontal by adjusting the rear end of the refracting lens 11 downwardly through the medium of the adjusting nut 17 as described.

Preferably, we provide means for limiting the height horizontally to which the rays projected may extend, this means taking the form of a light shield in the form of a curved band 20 engaging the front lower edge of the casing 1 and held thereto by clamping screws 21. The lower edge of this shield extends below the edge of the casing 1 as shown in Figures 1 and 2 and lies in a substantially horizontal plane. It may be adjusted vertically relatively to the lower edge of the casing by means of vertical slots 22 formed therein through which the clamping screw 21 extends so that the height limit may be varied.

Since in the above described device for projecting illuminating light rays from a concealed source, the bulb and reflector are concealed by the casing 1 from view, a light bulb 4 of much higher candle power may be used to increase the extent of forward illumination than is permissible with the light bulbs now used in projectors of the direct lighting type as contrasted with indirect lighting type of the present invention.

To offset the greater heat developed by the higher powered lights, suitable means for ventilating and cooling the interior of the projector is desirable. In the drawings, we have shown a series of small apertures in the light casing 1 at its lower face and top, by means of which cool air may enter the base of the casing between the reflector and casing. It should be noted incidently that with such a construction used with the headlight of a motor vehicle, the heated interior of the casing is cooled by forced draft due to the movement of the vehicle.

As we have previously stated, the light projector described is particularly adapted for and useful in connection with motor vehicles, but it will be obvious that the indirect lighting employed makes it adaptable for use generally for illumination without glare such, for example, as lighting window displays, landing fields, etc. The particular physical construction herein disclosed is intended as suggestive rather than restrictive of the invention and is susceptible of variation to suit varying conditions of manufacture and use in consonance with the spirit of the invention and scope of the appended claims.

What we claim, therefore, and desire to secure by Letters Patent is:

1. A light projector comprising a casing, an internal concaved reflecting dome housed therewithin with its axis substantially in the vertical and its lower edge substantially in the horizontal, a radiant light emitting bulb supported within said dome at its upper end, a refracting lens at the lower horizontal edge of said dome extending in an approximately horizontal plane and constituting a closure for said casing, said lens being formed to refract forwardly rays emitted by said bulb and reflected downwardly therethrough by the reflecting dome, means for effecting a tilting adjustment of said lens about a substantially horizontal axis to vary the angle of forward refraction, and a shield mounted upon the forward face of said casing at its lower edge having a substantially horizontal lower light-trimming edge and adjustable vertically on said casing to trim off and variably limit the vertical height of rays projected forwardly from said refracting lens.

2. A light projector comprising an inverted casing, a concaved reflecting dome housed therewithin with the axis substantially in the vertical and with its lower edge substantially in the horizontal, a radiant light emitting bulb supported within said dome, a refracting lens hinged at its front to the bottom edge of the casing and extending approximately in the horizontal, said lens being formed to refract forwardly rays emitted from said light bulb and projected downwardly therethrough by said reflecting dome, means for adjusting the rear end of said hinged lens in a vertical arc to vary the angle of forward refraction, and a shield secured to the front of said casing at its lower edge and vertically adjustable thereon, said shield having a substantially horizontal lower edge adjustable vertically to variably limit the height of light rays projected forwardly.

Signed at Nashville in the county of Davidson and State of Tennessee this 5th day of September A. D. 1928.

WILLIAM MARTIN CASSETTY, Jr.
WILLIAM CUTTER ALFORD.
FRANK L. ROSS.